United States Patent
Kelner et al.

(10) Patent No.: US 10,157,012 B2
(45) Date of Patent: Dec. 18, 2018

(54) ZERO READ ON TRIMMED BLOCKS IN A NON-VOLATILE MEMORY SYSTEM

(71) Applicant: SanDisk Technologies Inc., Plano, TX (US)

(72) Inventors: Vered Kelner, Moshav Gan Haim (IL); Gadi Vishne, Petach-Tikva (IL); Ravit Krayif, Or-Yehuda (IL)

(73) Assignee: SanDisk Technologies LLC, Plano, TX (US)

( * ) Notice: Subject to any disclaimer, the term of this patent is extended or adjusted under 35 U.S.C. 154(b) by 311 days.

(21) Appl. No.: 14/869,116

(22) Filed: Sep. 29, 2015

(65) Prior Publication Data

US 2017/0090815 A1    Mar. 30, 2017

(51) Int. Cl.
*G06F 12/00* (2006.01)
*G06F 13/00* (2006.01)
(Continued)

(52) U.S. Cl.
CPC .......... *G06F 3/0638* (2013.01); *G06F 3/064* (2013.01); *G06F 3/0611* (2013.01);
(Continued)

(58) Field of Classification Search
CPC .... G06F 3/0638; G06F 3/0635; G06F 3/0619; G06F 3/0659; G06F 3/064; G06F 3/0611;
(Continued)

(56) References Cited

U.S. PATENT DOCUMENTS

| 6,425,053 B1 | 7/2002 | Considine et al. |
| 2006/0129750 A1* | 6/2006 | Lee ............ G06F 12/0246 711/103 |

(Continued)

FOREIGN PATENT DOCUMENTS

| WO | WO 2004/105022 A1 | 12/2004 |
| WO | WO 2008/054760 | 5/2008 |

OTHER PUBLICATIONS

Doug Rollins et al., "A Comparison of Client and Enterprise SSD Data Path Protection," Micron Technologies, Inc., 2011 (6 pgs).

(Continued)

*Primary Examiner* — Shane Woolwine
(74) *Attorney, Agent, or Firm* — Brinks Gilson & Lione

(57) ABSTRACT

A system and method is disclosed for providing zero data in response to a host data read directed to a logical address that is not associated with valid data. The system may be a non-volatile memory system including non-volatile memory and a controller configured to determine whether a logical address in a read command is associated with valid data. The controller may be configured to generate, store in non-volatile memory and retrieve from that non-volatile memory a zero data entry. The controller may also be configured to include any associated encryption key or logical address in the generation of the zero data in order to satisfy data path protection and/or encryption requirements for the non-volatile memory system. Storage and retrieval of the zero data may be via the non-volatile memory array or only the data latches of the non-volatile memory.

26 Claims, 9 Drawing Sheets

(51) Int. Cl.
    *G06F 13/28*    (2006.01)
    *G06F 3/06*     (2006.01)
    *G06F 12/14*    (2006.01)
    *G06F 21/00*    (2013.01)

(52) U.S. Cl.
    CPC .......... *G06F 3/0619* (2013.01); *G06F 3/0647* (2013.01); *G06F 3/0659* (2013.01); *G06F 3/0679* (2013.01); *G06F 3/0688* (2013.01); *G06F 12/1408* (2013.01); *G06F 21/00* (2013.01); *G06F 3/0635* (2013.01); *G06F 2212/402* (2013.01)

(58) Field of Classification Search
    CPC .... G06F 3/0688; G06F 3/0679; G06F 3/0647; G06F 12/1408; G06F 21/00; G06F 2212/402
    USPC ................................. 711/103, 104, 105, 152
    See application file for complete search history.

(56) References Cited

U.S. PATENT DOCUMENTS

| | | | | |
|---|---|---|---|---|
| 2009/0316492 | A1* | 12/2009 | Widjaja | G11C 11/404 365/189.2 |
| 2010/0042773 | A1* | 2/2010 | Yeh | G06F 12/0804 711/103 |
| 2014/0281581 | A1* | 9/2014 | Kasa | G06F 21/6218 713/190 |
| 2014/0281683 | A1* | 9/2014 | Dusija | G06F 11/0754 714/6.11 |
| 2015/0242640 | A1* | 8/2015 | Obukhov | G06F 21/602 713/193 |

OTHER PUBLICATIONS

International Search Report and Written Opinion for corresponding Application No. PCT/US2016/036362 dated Aug. 25, 2016.

\* cited by examiner

Mapping Table —115

702 — LBA | Physical Address or Zero Data Indicator — 704

| LBA | |
|---|---|
| 0 | |
| 1 | |
| 2 | |
| ⋮ | ⋮ |
| N | |

FIG. 7

Key Table —117

802 — LBA Range | Encryption Key — 804

| LBA Range | Encryption Key |
|---|---|
| 1-100 | |
| 101-200 | |
| 201-300 | |
| ⋮ | ⋮ |
| (N-100) - N | |

FIG. 8

Zero Entry Table —119

902 — LBA | Physical Address of Zero Data — 904

| LBA | |
|---|---|
| 0 | |
| 1 | |
| 2 | |
| ⋮ | ⋮ |
| X | |

FIG. 9

ZERO READ ON TRIMMED BLOCKS IN A NON-VOLATILE MEMORY SYSTEM

BACKGROUND

Non-volatile memory systems, such as NAND flash memory systems, are commonly used in electronic systems ranging from consumer products to enterprise-level computer systems. When a host that is in communication with a non-volatile memory system seeks to retrieve data from that non-volatile memory system, a host read command may be sent from the host that typically includes a logical address the non-volatile memory system can use to find data stored in a physical location assigned to that logical address. If the logical address is not associated with any valid data in the non-volatile memory system, then the non-volatile memory system is typically expected to send back a predetermined form of zero data in response to the host read command. Without the ability for the non-volatile memory system to respond with a predetermined zero data indication, the non-volatile memory system may return invalid data that might cause an error for the host.

One typical situation where a host may be seeking data that doesn't exist in a memory system is when a new and empty memory device is connected to the host. An existing solution for handling situations where a read command is seeking data from a logical address that isn't associated with valid data is for the memory system to simply to generate and read out zero data from a RAM buffer. This solution may not work for encrypted memory systems or data path protected systems. Another possible mechanism for avoiding read errors with a new memory system is to format all the memory cells to store recognized zero data. The act of formatting all the memory cells to store zero data, however, may affect the overall endurance of NAND memory cells in a non-volatile memory system.

BRIEF DESCRIPTION OF THE DRAWINGS

FIG. 7 is an example logical to physical mapping table for use in the system of FIG. 2A.

FIG. 8 is an example key table mapping logical block address ranges to encryption keys for use in the system of FIG. 2A.

FIG. 9 is an example zero entry table tracking physical addresses of zero data stored in the unmapped area of the non-volatile memory array of FIG. 2B.

DETAILED DESCRIPTION

Figure 1A:
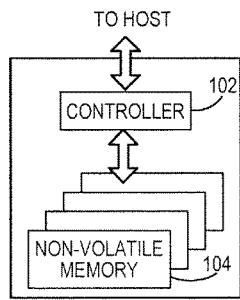
FIG. 1A is a block diagram of an example non-volatile memory system.

In a secure memory system, an efficient way to perform input or output (I/O) is to send all data through a cryptographic engine in both directions. Hardware in the memory system may automatically encrypt and decrypt data as it passes through the data path. Firmware intervention is not necessary during encryption or decryption processing in such a memory system and read automation using hardware tends to be more efficient than firmware/DDR processing of data.

However, if the host sends a request to the secure memory system for data which was never written, the device hardware path generally cannot be used for this purpose, and firmware is typically necessary to create zero (or uninitialized) data for return to the host. The same issue may occur in memory systems that have data path protection (DPP) enabled, where the logical block address (LBA) associated with the data needs to be stored with the data in the non-volatile memory so that the data and LBA may be retrieved in the format expected by the DPP and can be verified through the automated data path predetermined for data.

To address issues such as this, a system and method for providing zero data in an encrypted or data path protected memory system is disclosed. A zero data sequence may be written to an unmapped area in non-volatile memory, encrypted with the appropriate logical block address (LBA) key, or encoded with the appropriate DPP key. In encrypted devices, multiple LBAs, such as LBAs in a contiguous range, may use the same zero sequence, as long as they share a key. Also, when multiple encryption keys are used, each key may have one zeroed, unmapped LBA. When a read request is received for an unmapped area, where an unmapped area refers to a logical address (which may be a LBA) that is not currently mapped to a physical address in the primary logical to physical mapping table of the memory system, the appropriate unmapped LBA is read from. The existing read automation, for example the memory system hardware used to automatically transfer data from NAND to a front end utilizing NVMe/PCIe protocol without using firmware may then return the zeros, also referred to as zero data, associated with the host-requested unmapped LBA.

According to one aspect, a method is disclosed for providing expected zero data in a non-volatile memory system. The method may include receiving a read command from a host identifying a logical address, and determining whether valid data is present at the logical address. In response to determining that no valid data is present at the logical address, the memory system determines whether a zero data entry exists for the logical address. If no zero data entry exists, the non-volatile memory system may automatically generate a zero data entry for the logical address and storing the zero data entry in non-volatile memory of the non-volatile memory system. The zero data entry may then be retrieved from the non-volatile memory and transmitted to the host in response to the read command. In implementations when the non-volatile memory system is an encrypted system, the method may include the controller retrieving predetermined encryption information associated with the logical address and encrypting the zero data using the retrieved predetermined encryption information associated with the logical address. In implementations when the non-volatile memory system is a data path protected system automatically generating a zero data entry for the logical address may include the controller retrieving at least one of parity or error correction code information associated with the logical address and appending the at least one of the parity or error correction code information to the zero data prior to storing the zero data.

According to another aspect of the invention, a method for providing expected zero data in a non-volatile memory system may include a controller of the non-volatile memory system receiving from a host a read command identifying a logical address and determining whether the logical address is mapped to valid data in non-volatile memory of the non-volatile memory system. In response to determining that the logical address is mapped to valid data, valid data from the non-volatile memory is retrieved. Alternatively, in response to determining that the logical address is not mapped to valid data in the non-volatile memory, the controller automatically generates a zero data entry for the logical address, stores the zero data entry in unmapped pages of non-volatile memory of the non-volatile memory system, retrieves the zero data entry from the unmapped pages and transmits the retrieved zero data entry to the host in response to the read command.

According to yet another aspect of the invention, a non-volatile memory system is disclosed. The non-volatile memory system includes a non-volatile memory and a controller in communication with the non-volatile memory, the controller configured to determine whether a logical address in a read command received from a host is mapped to valid data in the non-volatile memory. In response to a determination that the logical address is not mapped to valid data, the controller is configured to determine whether zero data is available in an unmapped portion of the non-volatile memory for retrieval in response to the read command. The controller is also configured to, in response to a determination that zero data is not available in the unmapped portion, generate zero data, store the generated zero data in the unmapped portion, retrieve the zero data from the unmapped portion, and transmit the retrieved zero data to the host in response to the read command. In some implementations, the non-volatile memory system includes a logical-to-physical mapping table having a zero data indicator associated with logical addresses that are not associated with valid data, but that have a previously generated zero data entry available in an unmapped area of the non-volatile memory.

In yet another aspect, a method for providing expected zero data in a non-volatile memory system is disclosed. The method includes receiving a read command at the non-volatile memory system from a host identifying a logical address and determining whether valid data is present at the logical address. In response to determining that no valid data is present at the logical address, the system automatically generating zero data for the logical address, storing the zero data into, and retrieving the zero data from, data latches of non-volatile memory of the non-volatile memory system without storing the zero data into a non-volatile memory array in the non-volatile memory between the storing and the retrieving; and transmitting the zero data retrieved from the data latches to the host in response to the read command.

FIG. 1A is a block diagram illustrating a non-volatile memory system. The non-volatile memory (NVM) system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although in the example illustrated in FIG. 1A NVM system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
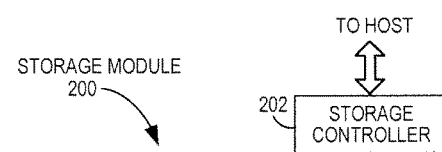
FIG. 1B is a block diagram illustrating an exemplary storage module.
Figure 1B:
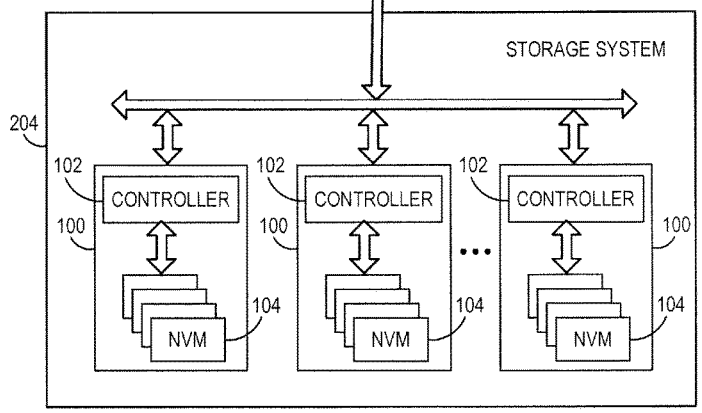

FIG. 1B illustrates a storage module 200 that includes plural NVM systems 100. As such, storage module 200 may include a storage controller 202 that interfaces with a host and with storage system 204, which includes a plurality of NVM systems 100. The interface between storage controller 202 and NVM systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
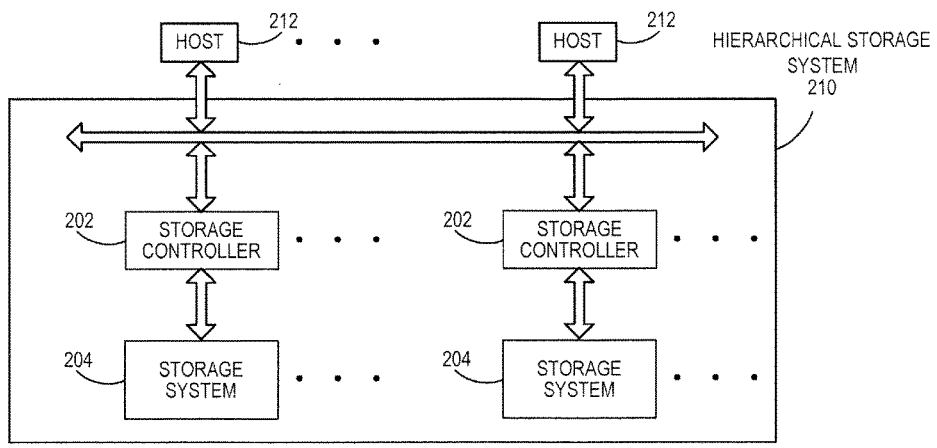
FIG. 1C is a block diagram illustrating a hierarchical storage system.

FIG. 1C is a block diagram illustrating a hierarchical storage system. A hierarchical storage system 210 includes a plurality of storage controllers 202, each of which control a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
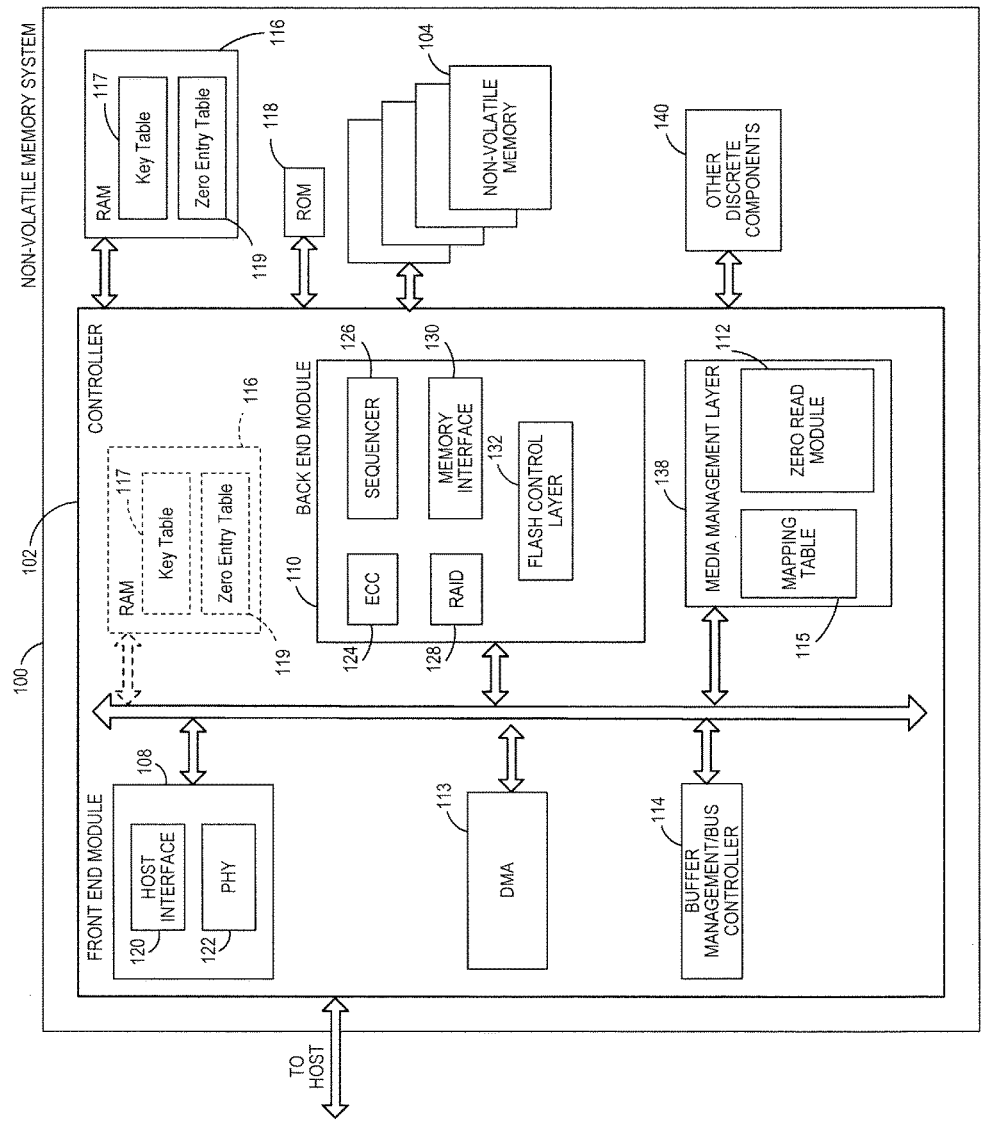
FIG. 2A is a block diagram illustrating exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a zero read module 112 present on the die of the controller 102. The zero read module 112 may be part of or separate from the media management layer 138 in the controller 102. The zero read module 112 may provide functionality for identifying whether a logical block address (LBA) received in a host read command is mapped to valid data in physical locations in the non-volatile memory 104, as well as the ability to generate zero data, store the generated zero data in an unmapped portion of the non-volatile memory and retrieve the generated zero data in response to a read command directed to an LBA that is not mapped to valid data. A direct memory access module (DMA) 113 may also be included in the controller 102. The DMA module 113 may be hardware circuitry, software, or a combination of hardware and software. The DMA module may be used to provide high-speed data transfer, or to control data transfer along a predetermined (also referred to herein as automated) data path, in the NVM system 100.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller. Further, in some implementations, the controller 102, RAM 116, and ROM 118 may be located on separate semiconductor die. In one embodiment, the memory system 100 may be a protected memory having either all data encrypted using one or more encryption keys, or may be a protected data path device where data stored in the non-volatile memory includes storing the data together with its respective LBA information in the non-volatile memory to permit data path protection (DPP) for that data. The encryption key information may be kept in a key table 117 in the RAM 116 and may be indexed by LBA or LBA range such that different keys are associated with different LBA ranges. The DMA module 113 may retrieve the necessary keys for use in encrypting or protecting the data path used for information stored in the non-volatile memory 104.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the NVM system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of NVM system 100 illustrated in FIG. 2A include the media management layer 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
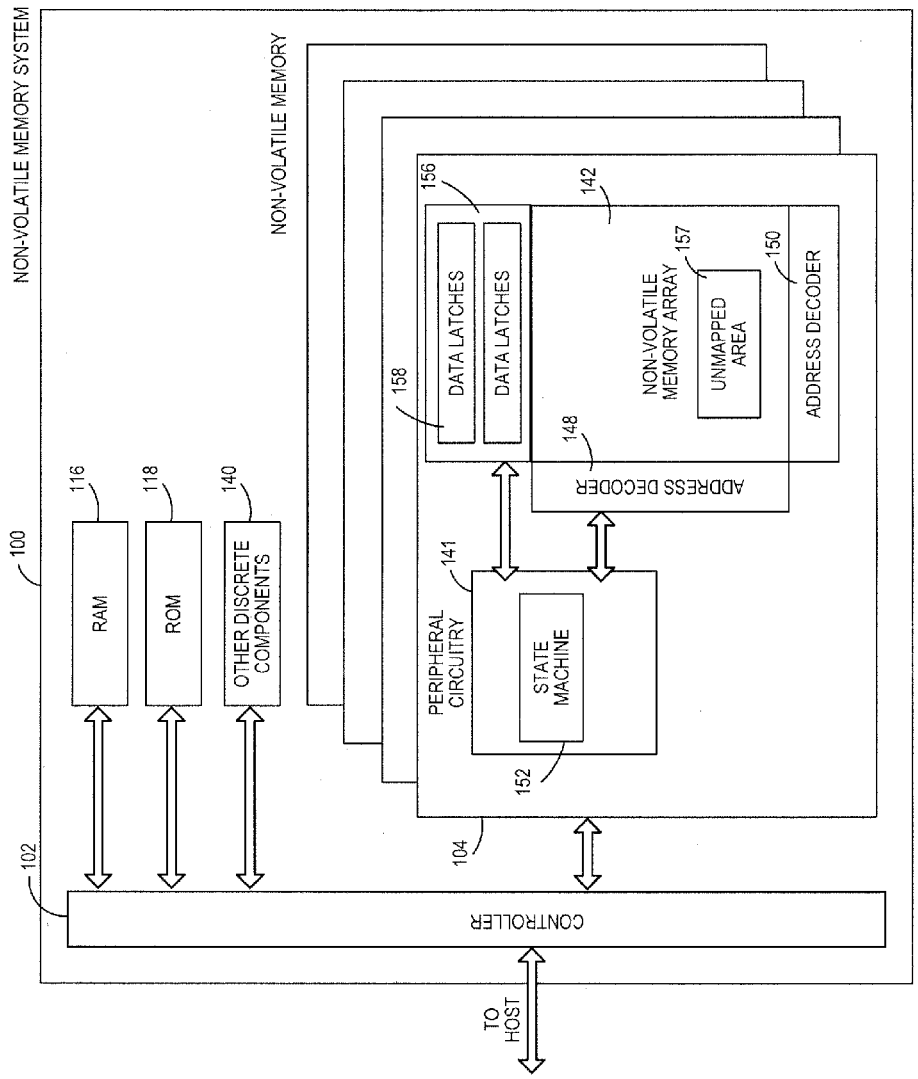
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data being read from or programmed into the non-volatile memory cells of the non-volatile memory array 142. The data cache 156 comprises sets of data latches 158 for each bit of data in a memory page of the non-volatile memory array 142. Thus, each set of data latches 158 may be a page in width and a plurality of sets of data latches 158 may be included in the data cache 156. For example, for a non-volatile memory array 142 arranged to store n bits per page, each set of data latches 158 may include n data latches where each data latch can store 1 bit of data.

In one implementation, an individual data latch may be a circuit that has two stable states and can store 1 bit of data, such as a set/reset, or SR, latch constructed from NAND gates. The data latches 158 may function as a type of volatile memory that only retains data while powered on. Any of a number of known types of data latch circuits may be used for the data latches in each set of data latches 158. Each non-volatile memory die 104 may have its own sets of data latches 158 and a non-volatile memory array 142. Peripheral circuitry 141 includes a state machine 152 that provides status information to controller 102. Peripheral circuitry 141 may also include additional input/output circuitry that may be used by the controller 102 to transfer data to and from the latches 158, as well as an array of sense modules operating in parallel to sense the current in each non-volatile memory cell of a page of memory cells in the non-volatile memory array 142. Each sense module may include a sense amplifier to detect whether a conduction current of a memory cell in communication with a respective sense module is above or below a reference level.

One or more of the non-volatile memory die 104 may include unmapped areas 157. The unmapped memory areas 157 may include spare blocks that are not mapped to logical addresses in the logical-to-physical mapping table 115. The spare blocks may also contain flash translation layer table and obsolete data. As discussed in greater detail below, in one implementation the controller 102 may generate and store zero data in the unmapped areas 157 in response to receiving a host read request for data at LBAs that have not been written to previously.

Figure 3:
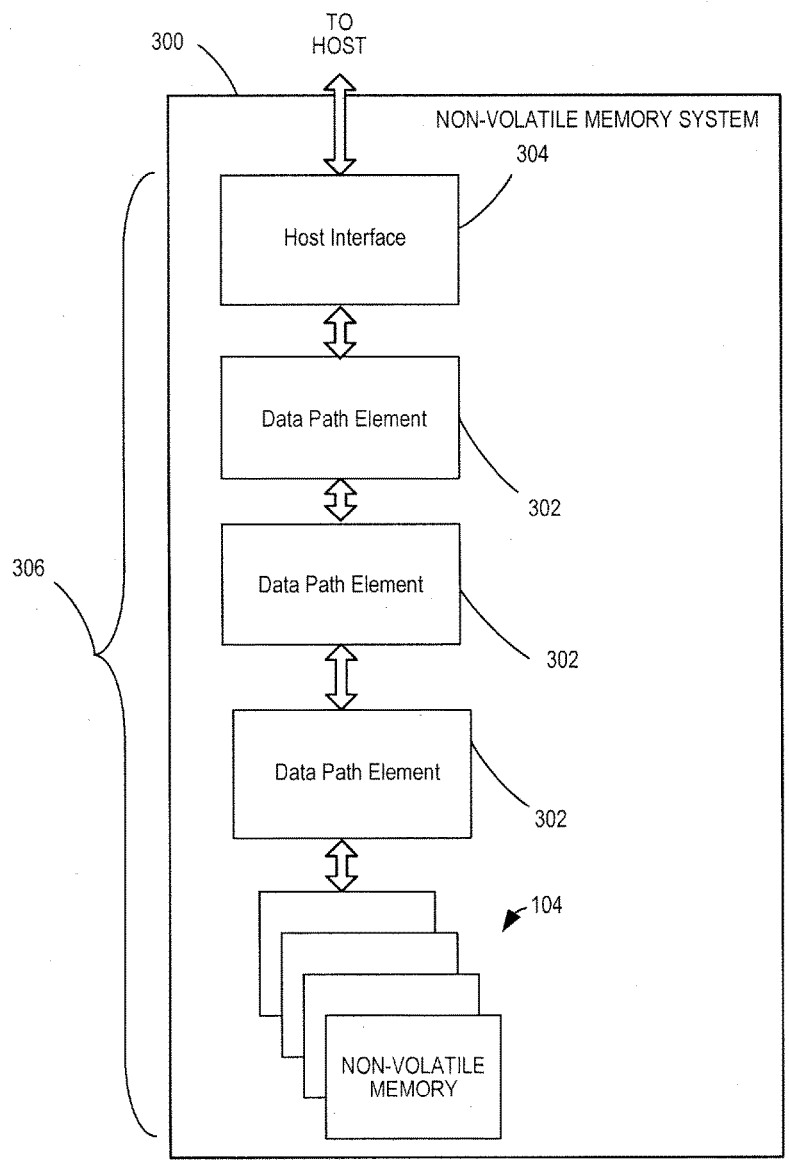
FIG. 3 is a simplified version of the non-volatile memory system of FIG. 2A illustrating an example of a data path and data path elements.

Referring now to FIG. 3, a conceptual and simplified diagram of the memory system 100 of FIGS. 2A-2B is illustrated. The non-volatile memory system 300 of FIG. 3 defines a data path 306 having a plurality of data path elements 302 between the host interface 304 and the non-volatile memory die 104, where the interface 304 and non-volatile memory die 104 may be the same as those described in FIG. 2A. Each of the data path elements 302 may be any of the components of the NVM system 100 that data passes through, or subcomponents of those components. For example, a data path element 302 may represent a particular register, buffer, portion of the controller 102 or other process point between the host interface 304 and the non-volatile memory die 104, such as those in the components of the non-volatile memory system 100 shown in the implementation of FIGS. 2A-2B.

In embodiments where the memory system 300 is configured as a data path protected (DPP) system, the controller 102, for example the DMA module 113 of the controller 102, may direct data coming into the non-volatile memory system and being read out of the memory system to traverse predetermined data paths 306. In other words, the same data path elements 302 the data passed through to get to the non-volatile memory will be the same elements each time. Similarly, the data path elements 302 through which data is retrieved from the non-volatile memory 104 will be the same each time, although the particular group of data path elements 302 used to write the data may differ from those used in a data read. For example, different types of random access memory buffers (e.g. dynamic RAM (DRAM) and static RAM (SRAM)) may be used in data reads or data writes in a DPP system.

Also, in addition to requiring that data read from the non-volatile memory system 300 be read from the non-volatile memory 104 and pass through a predefined data path 306, the controller 102 may provide protection by way of verification of parity bits for checking that the data entering a data path element 302 is the same when it exits that data path element 302. Data path protection may be used separately from, or in combination with encryption of the data in the non-volatile memory. In one embodiment, the controller 102 may be configured so that the encrypted keys are accessible from a key table 117 or other data structure in volatile memory such as RAM 116. The RAM may be in the controller 102 itself or outside the controller. The controller, in encrypted memory system embodiments, may also require that data only be retrieved from the non-volatile memory in response to a read command, and not permit retrieval of data first originating in a buffer outside of the non-volatile memory.

Figure 4:
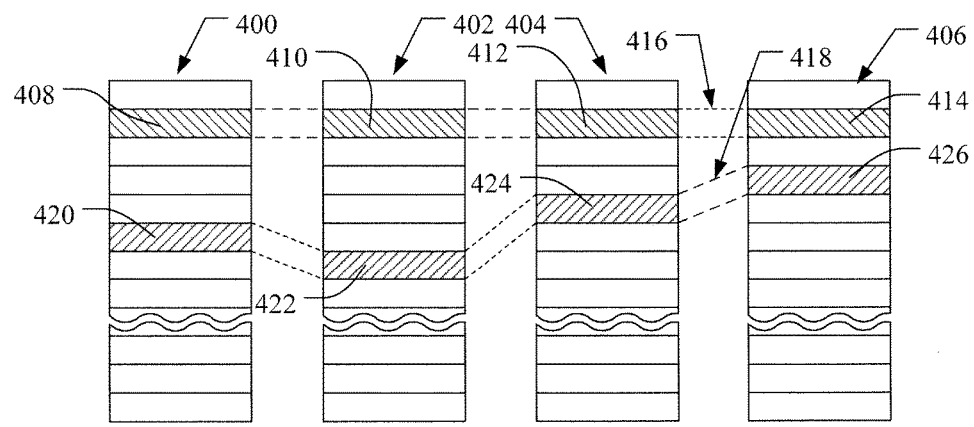
FIG. 4 illustrates an example physical memory organization of the non-volatile memory system of FIG. 1A.

The non-volatile flash memory array 142 in the non-volatile memory 104 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 4, a conceptual illustration of a representative flash memory cell array is shown. Four planes or sub-arrays 400, 402, 404 and 406 of memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 4 by rectangles, such as blocks 408, 410, 412 and 414, located in respective planes 400, 402, 404 and 406. There may be dozens or hundreds of blocks in each plane. Blocks may be logically linked together to form a metablock that may be erased as a single unit. For example, blocks 408, 410, 412 and 414 may form a first metablock 416. The blocks used to form a metablock need not be restricted to the same relative locations within their respective planes, as is shown in the second metablock 418 made up of blocks 420, 422, 424 and 426.

The individual blocks are in turn divided for operational purposes into pages of memory cells, as illustrated in FIG. 4. The memory cells of each of blocks 408, 410, 412, and 414, for example, are each divided into eight pages P0-P7.

Figure 5:
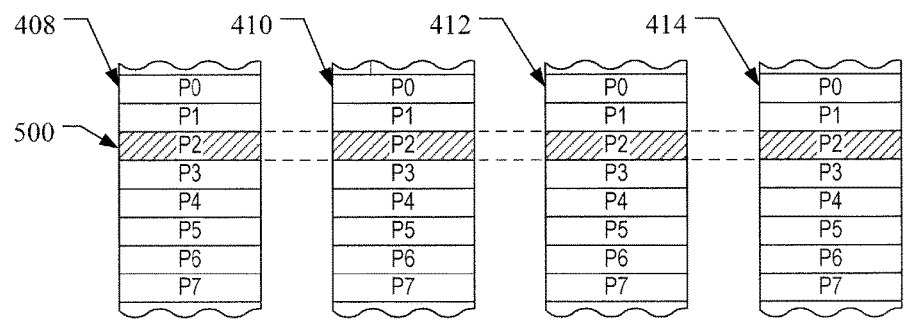
FIG. 5 shows an expanded view of a portion of the physical memory of FIG. 4.

Alternately, there may be 16, 32 or more pages of memory cells within each block. A page is the unit of data programming within a block, containing the minimum amount of data that are programmed at one time. The minimum unit of data that can be read at one time may be less than a page. A metapage 500 is illustrated in FIG. 5 as formed of one physical page for each of the four blocks 408, 410, 412 and 414. The metapage 500 includes the page P2 in each of the four blocks but the pages of a metapage need not necessarily have the same relative position within each of the blocks. A metapage is typically the maximum unit of programming, although larger groupings may be programmed. The blocks disclosed in FIGS. 4-5 are referred to herein as physical blocks because they relate to groups of physical memory cells as discussed above. As used herein, a logical block is a virtual unit of address space defined to have the same size as a physical block. Each logical block may include a range of logical block addresses (LBAs) that are associated with data received from a host. The LBAs are then mapped to one or more physical blocks in the non-volatile memory system 100 where the data is physically stored.

Figure 6:
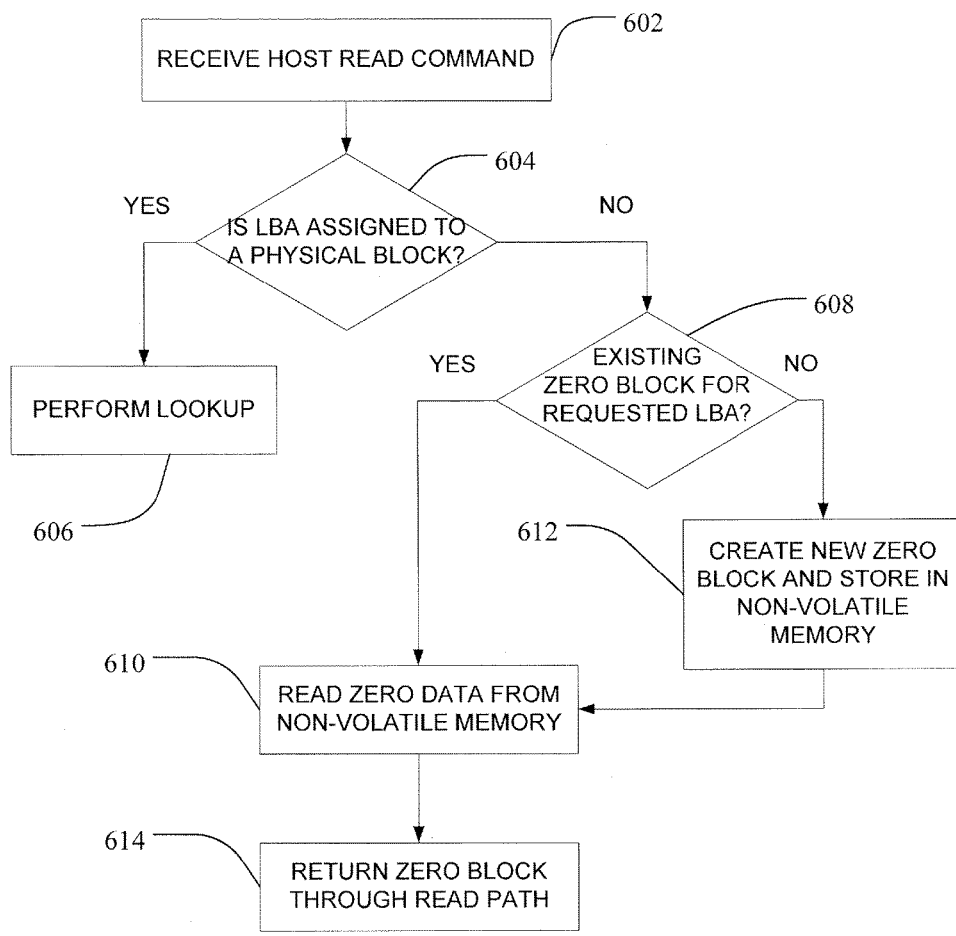
FIG. 6 is a flow diagram illustrating an embodiment of a method of generating and retrieving zero data for host read requests directed to LBAs not mapped to physical blocks.

Referring to FIG. 6, one implementation of a method for generating zero data utilizing the systems discussed above is illustrated. As used herein, "zero data" may be actual zeros or any predetermined data recognized by the host operating system as zero, or non-existent, data. The example of FIG. 6 assumes a non-volatile memory system 100 having encryption and/or data path protection mechanisms that require retrieval of data from the non-volatile memory and does not permit bypassing retrieval from the non-volatile memory 104. When a read command is received at the non-volatile memory system 100 (at 602), the controller 102 may determine if the logical address that is included in the read command has valid data associated with it in the non-volatile memory (at 604). In one implementation, this determination is made by the controller reading a logical-to-physical mapping table 115, such as group address table (GAT), that is stored in the non-volatile memory 104 and/or copied into RAM 116 or other volatile memory in the memory system 100. If the mapping table 115 includes a physical address that is associated with the requested logical address, then the controller 102 may retrieve the data from the designated physical address and process the data through the decryption or protected data path 306 used by the memory system (at 604, 606).

If the mapping table 115 does not include a physical address that is associated with the logical address in the command, then the zero read module 112 will look to see if a zero data indicator is associated with the logical address (at 608). This may be accomplished by the zero read module 112 identifying a zero data indicator in the mapping entry instead of a physical address. An example of a zero indicator may include a flag or extra bit set to a predetermined state in the mapping table 115. In response to finding a zero data indicator in the mapping table 115 and associated with the requested logical address, the zero read module 112 may then go to the zero entry table 119 to retrieve a zero data entry previously generated for the logical address, or for a range of logical addresses that include the logical address, from an unmapped area 157 in the non-volatile memory array 142 of the non-volatile memory 104, where "unmapped" in this context refers to a physical address in the unmapped area 157 of the non-volatile memory 104 not currently associated with a logical address in the primary logical-to-physical mapping table 115.

In one implementation, the zero indicator may trigger the zero read module 112 to look for the physical location of the previously generated zero data entry in the zero entry table 119. The previously generated zero data entry may then be read from the unmapped area 157 in the non-volatile memory array 142 of the non-volatile memory 104 at the physical address of the zero data identified in the zero entry table 119 (at 610). The retrieved zero entry may then be decrypted and/or routed along the predetermined protected data path and returned to the host (at 614). Alternatively, if no zero entry blocks exist, in this embodiment if no zero data indicator is found in the mapping entry of the logical-to-physical mapping table 115, then the zero read module generates a zero data entry and stores the newly generated zero data entry in the unmapped region of the non-volatile memory array 142 in the non-volatile memory 104 (at 608, 612). The zero read module 112 then reads the zero data back from the non-volatile memory array 142 and returns the data to the host through the read path and/or decryption operation (at 610, 614).

In order to generate a zero data entry, the zero read module in the controller may retrieve a predetermined zero entry pattern understood by the mapping system of the host and store that pattern in an unmapped area 157 of the non-volatile memory 104. The storing of zero data may include, if the non-volatile memory system 100 is an encrypted system, retrieving any encryption key from a key table 117 and then storing the data into the unmapped area 157. If the encryption keys vary based on the LBA or LBA range, then the appropriate key may be selected from the key table 117 by the zero read module 112 based on the received LBA. Similarly, if there is no encryption, but there is data path protection, then the zero read module 112 may retrieve the zero data that has been stored with its respective LBA information so that the existing NVM memory system retrieves the zero data in the expected data path protection format (i.e. the data stored with its LBA data in an entry formatted according the format expected by the NVM system 100). In any case, the resulting zero data generated by the zero read module (encrypted without data path protection, data path protected only, or processed with a combined encryption and data path protection) is subsequently stored in block(s) in the unmapped area 157 of the non-volatile memory 104. The controller 102, using the zero read module 112 may then retrieve the zero data from the unmapped area 157 and decrypt the zero data with a decryption key, and/or direct the zero data along the protected data path 306 identified by a DPP key, found in the and transmit the zero data out to the host.

In embodiments where there is no zero data entry already in the unmapped area 157 of the non-volatile memory array 142, the zero data generated by the zero read module 112 may be deleted after being read back from the non-volatile memory, or it may be permitted to persist and the zero entry table 119 updated with the physical address in the unmapped area containing the zero data. Additionally, in instances where generation of zero data by the zero read module 112 is necessary, the zero read module executes the generation, storing and reading of the zero data in an atomic manner such that no maintenance operations, such as garbage collection, block erasure or other data movement activity, may take place between the generation of the zero data and the retrieval of the zero data. The controller 102 may implement the uninterrupted, atomic process of generating, storing and retrieving the zero data in any of a number of ways, for example by temporarily blocking a command execution queue in the controller 102 such that a zero data read operation must be completed before executing any other command.

Referring to FIG. 7, one example of the contents of the mapping table 115 is illustrated. The mapping table 115 may include a table of LBAs and any associated physical block address or zero data indicator 704 for those LBAs that are mapped to a physical block address or that include previously generated zero data in the unmapped area 157 of the non-volatile memory array 142. Other data structure configurations and additional data types are contemplated for the mapping table 115 in alternative embodiments. As noted above, the zero data indicator 704 may be the same flag or bit for those LBAs 702 that have previously generated zero data in the unmapped area 157 of the non-volatile memory array 142. The presence of the zero data indicator 704 may trigger the controller 102 to automatically parse the zero entry table to find a physical address in the unmapped area 157 containing a previously generated zero data entry for the host-requested LBA.

Examples of the key table 117 and zero entry table 119 that may be stored in volatile memory 116 are illustrated in FIGS. 8 and 9, respectively. The key table 117 may include a list of any LBA ranges 702 that are to be encrypted, and the associated encryption key 804 for that LBA range. The zero entry table 119 may include any LBA 902 having zero data in the unmapped area 157 of the non-volatile memory array 142 and the physical address 904 in the unmapped area 157 of the non-volatile memory array 142 in which the previously generated zero data for that LBA 902 may be found.

Figure 10:
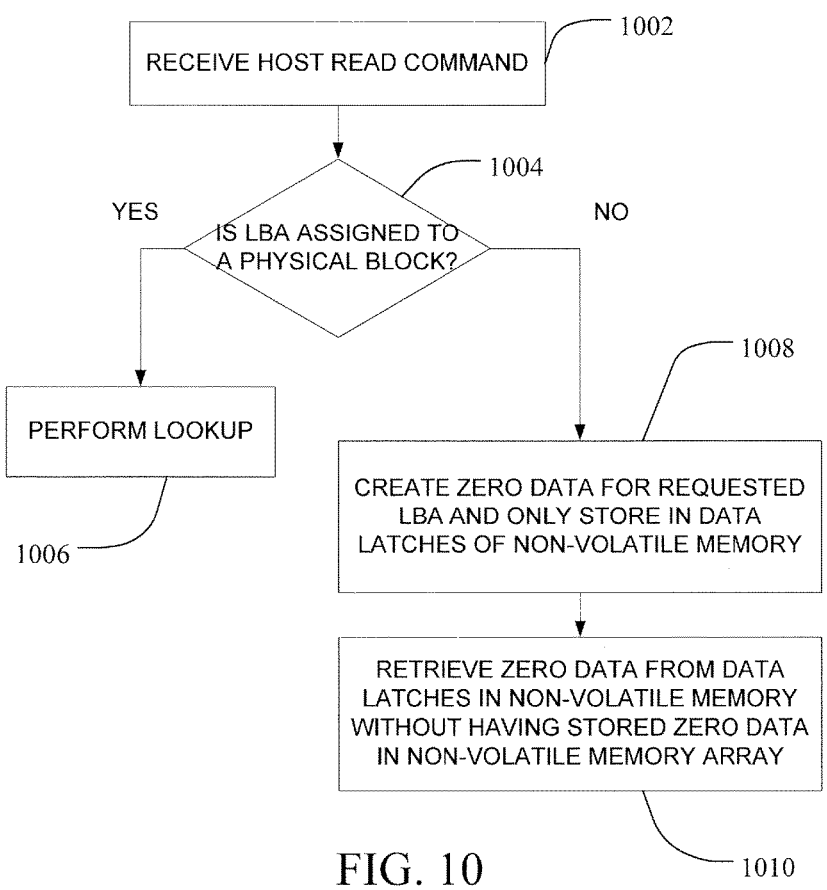
FIG. 10 is flow diagram illustrating an alternative embodiment of the method of FIG. 6 where the zero data generated by the non-volatile memory system may be transferred into and out of data latches associated with a non-volatile memory array without being programmed into the non-volatile memory array itself.

In an alternate implementation, the system and method described above for generating and retrieving zero data may send data to and from the non-volatile memory die 104, but avoid writing the generated zero data into the memory cells of the non-volatile memory array 104 as described with reference to FIG. 6. Referring now to FIG. 10, a host read command is received (at 1002) at the controller 102. If an LBA associated with the host read command is mapped to a physical block (at 1004) in the logical-to-physical mapping table 119, then the controller looks up the physical address, retrieves data from the non-volatile memory array 142 at that address, and returns that data to the host (at 1006). If there is no physical block assigned to the LBA in the host read command (at 1004), then the host is attempting to read an unwritten LBA and needs to be sent zero data. The NVM system 100 then generates zero data in much the same manner as described with reference to FIG. 6 (adding in the appropriate encryption of the zero data and/or adding the LBA information to the zero data before storing the zero data for encrypted and/or data path protected versions of the NVM system 100). In the embodiment of FIG. 10, however, the generated zero data is sent by the controller to the data latches 158 of the non-volatile memory 104 (at 1008) and then retrieved from the data latches 158 (at 1010) without ever being programmed from the data latches 158 into the non-volatile memory array 142. The process of programming non-volatile memory 104 may be a two-step process, where the first step involves transferring data from a buffer such as RAM 116 to the data latches 158 and the second step involves the controller sending a command to program the non-volatile memory array 142 with data from the latches 158. The embodiment of FIG. 10 may involve the controller simply withholding the command to program the data from the latches 158 to the non-volatile memory array 142 and instead transferring the data stored in the latches 158 back out of the latches and back through a predetermined data path to the host.

Because, in one embodiment, the function of encryption and/or data path protection in the NVM system 100 is premised on data paths leading into or out of the non-volatile memory die and is not dependent on what part of the non-volatile memory 104 the data is written to, the retrieved generated zero data only needs to come from the non-volatile memory 104 in the correct encrypted format (for an encrypted memory implementation) or come from the non-volatile memory 104 combined with the LBA information in the expected combined LBA and data format (data path protection) used by the NVM system 100. Accordingly, the generated zero data with appropriate encryption, and/or stored with the zero data's LBA in a predetermined format, does not ever have to be written from the data latches 158 into the unmapped area 157 of the non-volatile memory array 142. The existing encryption and/or data path protection processes configured in the NVM system 100 may still be used for data written to and read from the non-volatile memory 104 without programming the data from the data latches 158 to the non-volatile memory array. As with the embodiment of FIG. 6, any of a number of data path protected data formats may be used in NVM systems 100 having data path protection. For example, the LBA information (in one example the host requested LBAs that triggered the generation of the zero data) for the generated zero data may simply be appended to the generated zero data and stored together in the data latches 158.

Only transferring the generated zero data into and out of the data latches 158 in the non-volatile memory 104, without ever programming that zero data into the non-volatile memory array 12 in the non-volatile memory 104, may assist with saving time and wear. Programming of non-volatile memory cells, such as NAND memory, takes a certain amount of time and adds to the program/erase cycling of the non-volatile memory cells in the non-volatile memory array 142. Given that the process of generating zero data at the NVM system in real-time in response to a host read directed to unmapped LBAs may already insert a certain delay, the storage of the zero data only in the latches and bypassing any storage in the non-volatile memory array may save some time in the process of responding to the host read.

In one implementation of the data latch-only storage of generated zero data, the storage and retrieval of the generated zero data may be an atomic process. In other words, the process of writing zero data to and from the data latches 158, without writing the generated zero data to or reading it from the non-volatile memory array 142, may be executed as uninterrupted and sequential steps. Similar to the atomic version discussed above with respect to the zero data generation embodiment of FIG. 6, an atomic sequence of writing the generated data to and from the data latches in FIG. 10 may avoid unintended overwriting of the generated zero data by other write or read activity at the non-volatile memory 104. The atomic sequence of reading and writing to and from the data latches without writing to or reading from the non-volatile memory array may be triggered by a command sent by the controller 102 to prevent execution of any other commands relating to transferring data into or out of the data latches 158 prior to completing the write into and read out of the data latches 158.

Figure 11:
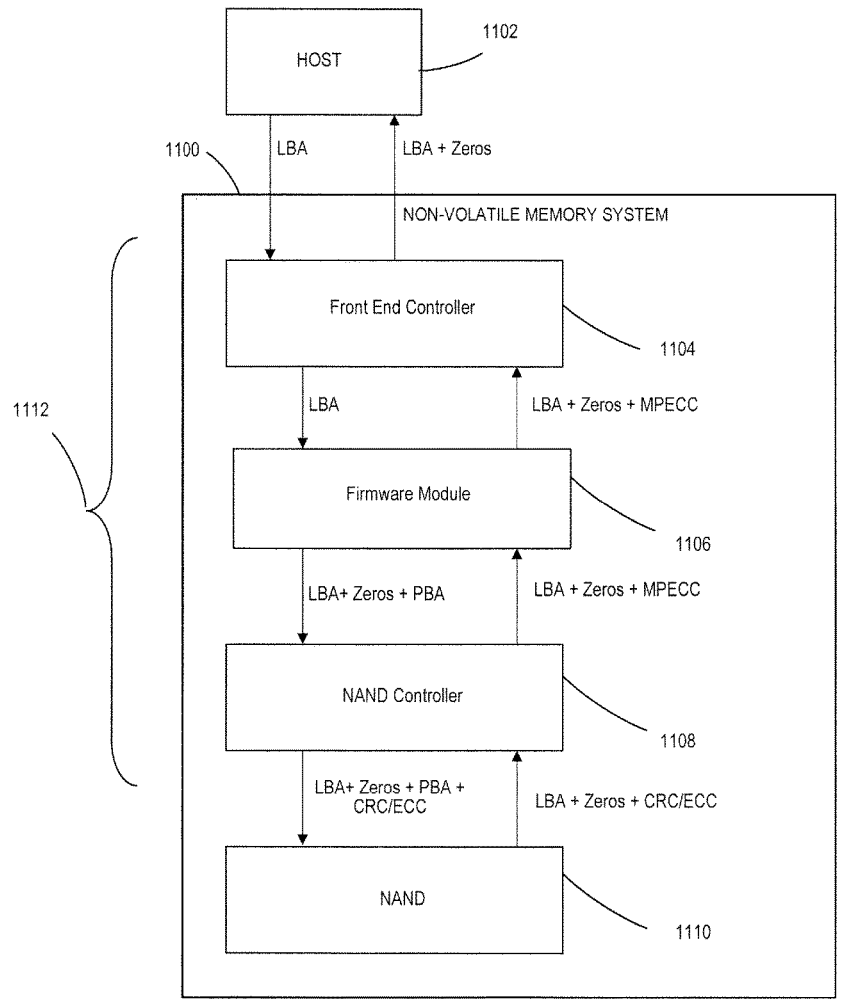
FIG. 11 illustrates one example of responding to a host read command directed to an unmapped LBA implementing the method of FIG. 10.

Referring now to FIG. 11, one example of a host read to unwritten LBAs in a data path protected NVM system 100 using the method of FIG. 10 is illustrated. The host 1102 initially sends a read request identifying a desired LBA to the NVM system 1100. The front end controller 1104 (which may be the same as controller 102 of FIG. 2A) processes the LBA data and may utilize a firmware module 1106, such as the media management layer 138, which decides that it should use the zero read module 112 of FIG. 2A, when the read request is directed to unmapped LBAs, and generate zeros as discussed above. The firmware module 1106 sends the desired LBA information, the generated zeros and the physical block address (PBA) for the zeros to the NAND controller 1108. The NAND controller 1108 may be equivalent to the back end module 110 of FIG. 2A in one implementation. The NAND controller 1108 takes the LBA, zeros and PBA from the firmware module 1106 and may add a cyclic redundancy code (CRC) and an error correction code (ECC) to the zeros. The NAND controller then sends the LBA information, the generated zeros, the PBA and the CRC/ECC information to the NAND die 1110. The NAND die 1110 may be represented by the non-volatile memory 104 in FIG. 2A and the sending of the data by the NAND controller 1108 may be carried out by the flash control layer 132 transferring the data from the RAM 116 to the data latches 158 on the non-volatile memory die 104 identified in the PBA information.

Assuming that the zero generation method is that of FIG. 10, where the zeros and the LBA data are stored together in the latches 158 and then subsequently retrieved from the data latches 158 without ever being written to the non-volatile memory array in the non-volatile memory, the PBA provided by the firmware module 1106 may be a complete address, including die, physical page and physical block number, but only a portion of that address is necessary, for example a die number of the plurality of non-volatile memory die in the non-volatile memory 104. If the zero generation method of FIG. 6 is used, then the complete physical block address would be used to identify where in the unmapped area 157 of the non-volatile memory array 142 in a particular die the zeros and LBA data would be stored.

The zero data and associated LBA information stored with the zero data would then be retrieved from the data latches in the NAND 1110, along with the CRC/ECC encoding. The NAND controller 1108 then decodes the CRC and ECC information and adds parity information, sometimes referred to as memory path error correction code or MPECC, understood by the front end controller 1104. The LBA, zeros and MPECC data may then be passed through the data path elements via the firmware module 1106 to the front end controller. The MPECC data allows the front end controller 1104 to verify that the zero data and its LBA information arrived as expected from the NAND 1110. The data path 1112 may be defined by the path over which the various types of parity protection, such as the MPECC, is used to verify that the data was retrieved from and passed through the expected data path elements such that the data is in its expected form. Although firmware may be able to add in the LBA information to the zero data needed to satisfy one typical data path protection check, the parity information such as the MPECC is a digital signature that typically needs to be implemented by controller hardware. By generating zeros for read requests to unmapped LBAs and storing them on, and retrieving them from, the NAND die 104 (in either the latches only in the embodiment of FIG. 10, or into the non-volatile memory array 142 via the latches 157 as in the embodiment of FIG. 6) the NVM system 100 can utilize existing encryption and or data path protection mechanisms without modifying those mechanisms.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

Methods and systems for handling host read requests directed to LBAs that are not mapped to physical addresses in a NVM system have been disclosed. The NVM system generates and stores zeros or other data recognized by the host as zero data in non-volatile memory. The non-volatile memory contains data latches and a non-volatile memory array of non-volatile memory cells. The generated zero data may be stored and retrieved from the non-volatile memory array or just transferred into and out of the data latches of the non-volatile memory without being programmed into, or read from, the non-volatile memory array in the non-volatile memory.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A method for providing expected zero data in a non-volatile memory system, the method comprising:
   receiving a read command from a host identifying a logical address;
   determining whether valid data is present at the logical address;
   in response to determining that no valid data is present at the logical address:
      determining whether a zero data entry exists for the logical address;
      in response to determining that no zero data entry exists:
         automatically generating a zero data entry for the logical address;
         storing the zero data entry in non-volatile memory of the non-volatile memory system;
         retrieving the zero data entry from the non-volatile memory, wherein the non-volatile memory comprises a plurality of data latches in communication with a non-volatile memory array, and wherein storing the zero data entry in non-volatile memory and retrieving the zero data entry comprises:
            storing the zero data entry in the non-volatile memory array via the plurality of data latches and subsequently retrieving the zero data entry from the non-volatile memory array via the plurality of data latches; and
         transmitting the retrieved zero data entry to the host in response to the read command.

2. The method of claim 1, wherein determining whether valid data is present comprises a controller of the non-volatile memory system comparing the logical address to a mapping table in the non-volatile memory system.

3. The method of claim 2, wherein determining whether valid data is present comprises the controller determining that valid data is not present when no physical address is associated with the logical address in the mapping table.

4. The method of claim 1, wherein determining whether a zero data entry exists for the logical address comprises a controller of the non-volatile memory system determining if a zero data entry marker is present in the non-volatile memory, and determining that the zero data entry exists when the zero data entry marker is associated with the logical address in the non-volatile memory.

5. The method of claim 4, wherein the zero data entry marker comprises a flag associated with the logical address in a mapping table in the non-volatile memory.

6. The method of claim 1, wherein automatically generating a zero data entry comprises a controller of the non-volatile memory system retrieving predetermined encryption information associated with the logical address and encrypting zero data using the retrieved predetermined encryption information associated with the logical address.

7. The method of claim 1, wherein the non-volatile memory system comprises a protected data path, and wherein automatically generating a zero data entry for the logical address comprises a controller of the non-volatile memory system combining zero data with the logical address prior to storing the combined zero data and logical address as the zero data entry.

8. The method of claim 1, wherein the non-volatile memory comprises a plurality of data latches in communication with a non-volatile memory array, and wherein:
  storing the zero data entry in non-volatile memory comprises transferring the zero data into data latches in the non-volatile memory without programming the zero data into the non-volatile memory array, and
  retrieving the zero data comprises retrieving the zero data from the data latches such that the storing and the retrieving of the zero data occur without any intervening programming of the zero data into the non-volatile memory array.

9. A method for providing expected zero data in a non-volatile memory system, the method comprising:
  receiving a read command from a host identifying a logical address;
  determining whether valid data is present at the logical address;
  in response to determining that no valid data is present at the logical address:
    automatically generating zero data for the logical address;
    storing the zero data into data latches in the non-volatile memory system that are in communication with a non-volatile memory array of the non-volatile memory system, the data latches arranged to cache data to be programmed into the non-volatile memory array via a first predefined plurality of data path elements;
    retrieving the zero data from the data latches via a second predefined plurality of data path elements without storing the zero data into the non-volatile memory array between the storing and the retrieving; and
    transmitting the zero data retrieved from the data latches to the host in response to the read command.

10. The method of claim 9, wherein automatically generating the zero data comprises a controller of the non-volatile memory system retrieving predetermined encryption information associated with the logical address and encrypting the zero data using the retrieved predetermined encryption information associated with the logical address.

11. The method of claim 9, wherein the first predefined plurality of data path elements and the second plurality of data path elements in the non-volatile memory system comprises a protected data path, and wherein automatically generating zero data for the logical address comprises a controller of the non-volatile memory system combining the zero data with the logical address prior to storing the combined zero data and logical address.

12. A method for providing expected zero data in a non-volatile memory system, the method comprising:
  in a controller of the non-volatile memory system, receiving from a host a read command identifying a logical address;
  determining whether the logical address is mapped to valid data in non-volatile memory of the non-volatile memory system;
  in response to determining that the logical address is mapped to valid data, retrieving the valid data from the non-volatile memory;
  in response to determining that the logical address is not mapped to valid data in the non-volatile memory, the controller:
    automatically generating zero data for the logical address;
    storing the zero data in unmapped pages of non-volatile memory of the non-volatile memory system;
    retrieving the zero data from the unmapped pages of the non-volatile memory;
    transmitting the retrieved zero data to the host in response to the read command;
  wherein the non-volatile memory comprises a plurality of data latches in communication with a non-volatile memory array; and
  wherein storing the zero data in the unmapped pages of the non-volatile memory and retrieving the zero data from the unmapped pages of the non-volatile memory comprises:
    storing the zero data in the unmapped pages of the non-volatile memory array via the plurality of data latches and subsequently retrieving the zero data from the unmapped pages of the non-volatile memory array via the plurality of data latches.

13. The method of claim 12, wherein the non-volatile memory system comprises an encrypted data system, and wherein automatically generating the zero data comprises the controller encrypting the zero data prior to storing the zero data in unmapped pages of the non-volatile memory.

14. The method of claim 13, wherein encrypting the zero data comprises retrieving an encryption key from volatile memory associated with the controller and encrypting the zero data with the retrieved encryption key.

15. The method of claim 14, wherein the encryption key comprises a plurality of encryption keys and retrieving the encryption key further comprises selecting an encryption key from the plurality of encryption keys based on the logical address in the read command and encrypting the zero data with the selected encryption key.

16. The method of claim 12, wherein the non-volatile memory system comprises a protected data path having a plurality of data path elements through which all data to be stored in the non-volatile memory array is processed, and wherein automatically generating zero data for the logical address comprises the controller combining zero data with the logical address prior to storing the combined zero data and logical address in the unmapped pages of the non-volatile memory.

17. The method of claim 12, wherein determining whether the logical address is mapped to valid data in non-volatile memory comprises the controller of the non-volatile memory system comparing the logical address to a logical-to-physical mapping table in the non-volatile memory system.

18. The method of claim 17, wherein the controller determines that the logical address is not mapped to valid data when no physical address is associated with the logical address in the logical-to-physical mapping table.

19. The method of claim 12, wherein further in response to determining that the logical address is not mapped to valid data in the non-volatile memory, the controller preventing a maintenance operation on data associated with the logical address until after transmitting the retrieved zero data to the host.

20. The method of claim 19, wherein the maintenance operation comprises a garbage collection operation.

21. A non-volatile memory system comprising:
a non-volatile memory;
a controller in communication with the non-volatile memory, the controller configured to:
  determine whether a logical address in a read command received from a host is mapped to valid data in the non-volatile memory;
  in response to a determination that the logical address is not mapped to valid data, determine whether zero data is available in an unmapped portion of the non-volatile memory for retrieval in response to the read command; and
  in response to a determination that zero data is not available in the unmapped portion:
  generate zero data;
  direct the zero data through a first plurality of data path elements of a protected data path positioned between the controller and the unmapped portion;
  store the generated zero data in the unmapped portion;
  retrieve the zero data from the unmapped portion via a second plurality of data path elements of the protected data path positioned between the unmapped portion and the controller;
  verify that the retrieved zero data passed through the protected data path; and
  transmit the retrieved zero data to the host in response to the read command.

22. The non-volatile memory system of claim 21, further comprising a logical-to-physical mapping table, wherein the controller is configured to determine that the logical address is not mapped to valid data when no physical address is associated with the logical address in the logical-to-physical mapping table.

23. The non-volatile memory system of claim 22, wherein to determine whether zero data is available in an unmapped portion of the non-volatile memory, the controller is configured to look for a zero data entry marker associated with the logical address in the logical-to-physical mapping table.

24. The non-volatile memory system of claim 21, wherein the non-volatile memory comprises an encrypted non-volatile memory, and wherein to generate the zero data, the controller is configured to retrieve an encryption key associated with the logical address and to encrypt the zero data with the encryption key prior to storing the zero data.

25. The non-volatile memory system of claim 21, wherein the controller is configured to combine the generated zero data with the logical address prior to storing the zero data in the unmapped portion of the non-volatile memory.

26. The non-volatile memory system of claim 21, wherein the non-volatile memory comprises a silicon substrate and a plurality of memory cells forming a monolithic three-dimensional structure, wherein at least one portion of the memory cells is vertically disposed with respect to the silicon substrate.

* * * * *